Patented June 13, 1939

2,162,679

UNITED STATES PATENT OFFICE 2,162,679

POLYVINYL ACETAL RESINS

Harold F. Robertson, Coraopolis, Pa., assignor to Carbide and Carbon Chemicals Corporation, a corporation of New York No Drawing. Application April 1, 1939,
Serial No. 265,515

6 Claims. (Cl. 260—73)

This invention is directed to a group of artificial resinous substances which are capable of being formed into plastic compositions having remarkable properties of flexibility and resiliency coupled with great strength and toughness. The invention is specifically concerned with certain novel members of the general class termed polyvinyl acetal resins.

It is known that polyvinyl alcohol (obtainable by the saponification or hydrolysis of such polymerized vinyl esters as polyvinyl acetate) is a water-soluble substance which can be reacted with aldehydes to form resinous materials. Most of these materials previously disclosed in the art are thermoplastic, and differ from polyvinyl alcohol itself in that they are not soluble in water, but are soluble in a wide variety of organic substances, including many water-insoluble solvents, such as aromatic hydrocarbons, chlorinated hydrocarbons and various esters. As in the case of the simple alcohols, polyvinyl alcohol combines with aldehydes in the proportion of two molecular equivalents of its theoretical monomer, vinyl alcohol, to each molecular equivalent of aldehyde. Because these reaction products are analogous to the alkylidene diethers, they are usually called polyvinyl acetal resins. Two related members of the polyvinyl acetal class also are known. One includes the substances formed by the reaction of aldehydes with partially hydrolyzed polyvinyl esters, and these resins contain principally ester and acetal groups in their molecule. Such substances may be termed polyvinyl acetal-ester resins, and they are intermediate, in general properties and solubility characteristics, between the polyvinyl acetals and the polyvinyl esters. The other type of product may be termed polyvinyl alcohol-acetals, and are formed by the reaction of aldehydes with polyvinyl alcohol to an extent insufficient to render the porduct soluble in water-insoluble esters and the like, and thus are closely related to polyvinyl alcohol itself.

Polyvinyl esters, polyvinyl alcohol, the polyvinyl acetal resins, polyvinyl acetal-ester resins, and the polyvinyl alcohol-acetals referred to, may each form the basis of film-forming or plastic compositions. In general, these resins may be softened, or plasticized, to increase their flexibility by means of the solvents in which they are soluble. Thus, polyvinyl esters, polyvinyl acetals and polyvinyl ester-acetal resins may be softened by the addition of high-boiling esters (which are solvents for these materials), and polyvinyl alcohol and the polyvinyl alcohol-acetals may be softened by means of water (the only known solvent for polyvinyl alcohol). In the latter case, the volatility of water and its consequent tendency to be lost from the compositions can be partially offset by the use of hygroscopic agents, such as glycerine, in the compositions. This expedient has been proposed as particularly fruitful in the case of the polyvinyl alcohol-acetals, which, even when not soluble in water, are highly water-absorptive and are rendered soft and flexible by water, with or without added glycerine. The polyvinyl alcohol-acetals which are not soluble in water are usually soluble in the lower aliphatic alcohols and may be plasticized and rendered extensible by means of such solvents. The flexibility of these compositions almost invariably increases with and in direct proportion to the quantity of solvent plasticizer added. When the plasticized compositions are subjected to tensile tests and the elongation observed as a function of the load applied, it will be seen that, as the amount of solvent plasticizer in the composition is increased, the load required to produce a given elongation is markedly decreased.

Because of this fact, the resins discussed, when sufficiently plasticized to have high flexibility and extensibility, yield compositions of greatly reduced ultimate strength as compared with the unplasticized material. In addition, such compositions lack elasticity; that is, while they are flexible, they do not recover their original dimensions after the load applied is removed. The properties of compositions of these resins cannot be improved by attempting to soften the water-soluble polyvinyl alcohol or the polyvinyl alcohol-acetals with non-solvent plasticizers, such as the high-boiling esters, or by attempting to plasticize the ester-soluble polyvinyl esters, polyvinyl acetals, or the polyvinyl ester-acetals with water, owing to the complete lack of compatibility of the ingredients of such systems. Thus, where flexible and highly extensible compositions of the resins discussed are required, it is necessary to soften the resins with placticizers that are also solvents for the resins, with the inevitable result that products of low ultimate strength are secured which are almost entirely without elasticity. In addition, the polyvinyl esters, polyvinyl acetals and polyvinyl acetal-esters, when softened with solvent placticizers, are softened by heat at temperatures much below the heat softening temperatures of the unplacticized material, while polyvinyl alcohol and polyvinyl alcohol-acetals, when softened by water or water-soluble agents, have been found to be lacking in adhesive properties for glass, metal, or other smooth surfaces.

The primary object of this invention is to provide a class of inherently colorless artificial resinous materials which are largely free from the defects just discussed, and which can be softened with water-insoluble ester plasticizers to yield homogeneous compositions of excellent clarity and adhesiveness which have lasting properties of flexibility, resilience and elasticity, coupled with great strength and toughness. The invention also includes plasticized compositions of the new resins, and the methods of making these resins.

The new resins of my invention differ from the polyvinyl ester, polyvinyl acetal, and polyvinyl acetal-ester resins in that they have strikingly different and totally unexpected elastic properties when plasticized with water-soluble ester plasticizers, and they differ from the known polyvinyl alcohol-acetal resins (and, of course, from polyvinyl alcohol) in that they may be plasticized with water-insoluble ester plasticizers to yield homogenous and elastic compositions of high ultimate strength that have good adhesion to smooth surfaces.

The new resins which enable the objects of the invention to be achieved may be classed as polyvinyl alcohol-acetal resins, or polyvinyl partial acetal resins, of a very definite composition, and the composition of these particular resins was not at all predictable from a study of known resins of related types. The new resins are made by the reaction of certain aldehydes with polyvinyl alcohol or polyvinyl esters, and, in general, to obtain materials of adequate strength, the polymeric vinyl compound from which they are formed should have an average macromolecular weight of at least 7,000. Resins made according to this invention from polyvinyl bodies having average molecular weights in excess of 25,000 yield plasticized compositions of exceptionally high tensile strength and are the preferred resins of my invention. (Molecular weights referred to herein are calculated by means of Staudinger's formula from viscosity determinations on solutions of the materials.)

The resins contemplated by this invention are limited both by the nature and the quantity of the aldehyde contained in them, and these resins contain substantially only free hydroxyl groups of polyvinyl alcohol and acetal groups in their molecule. The proportion of aldehyde or acetal in the new resins will be indicated throughout as percent acetalization (which indicates the percentage of hydroxyl or functional groups in the polymeric body that are combined with aldehyde), and it is to be understood that my new resins are free from ester groups or any other groups in amounts sufficient to affect the solubility or other characteristics of the materials.

The aldehydes from which my new resins are made are butyraldehyde, propionaldehyde and valeraldehyde, and the order of preference among these three aldehydes is that given. The extent of acetalization for my new resins is different for each aldehyde. In any case, the degree of acetalization with the aldehyde material containing at least one of the saturated aliphatic aldehydes having from 3 to 5 carbon atoms in its molecule must be so correlated with the kind of aldehyde and the free hydroxyl groups in the resin that the product has those properties characterizing the resins of this invention. Thus, with butyraldehyde, the resins must be acetalized between about 54% and about 78%; with propionaldehyde, between about 62% and about 88%; and, with valeraldehyde, between about 39% and about 58%. These differences are occasioned by the fact that the properties of the resins have been found to vary with the length of the hydrocarbon chain of the aldehyde used, and the degrees of acetalization recited above have been found by test to be those which delimit resins of substantially the same properties.

This application is directed specifically to those resins made from propionaldehyde, and resins made from butyraldehyde and from valeraldehyde are the subjects of my copending applications Serial Nos. 236,556, filed October 22, 1938 and 265,516 filed April 1, 1939, respectively.

I have tried to make resins equivalent to those just defined using other aldehydes, but, so far as I have been able to determine, resins which are fully the equivalent of those of this invention with respect to color, strength or solubility characteristics cannot be formed from aldehydes of less than three or more than five carbon atoms regardless of their degrees of acetalization. Thus, certain of the desired qualities of the new resins may be obtained in resins made from acetaldehyde within certain narrow limits of acetalization, and certain other of the desired characteristics may be provided in resins acetalized with hexaldehyde within certain other narrow limits, but in no case have I found it possible to make resins from either of these two aldehydes which have all, or nearly all, of the outstanding properties of the resins specified above. Using formaldehyde alone or aldehydes higher than hexaldehyde, it is, so far as I have ascertained, not possible to make resins which have the qualities of the resins of this invention to any significant extent.

The resins of this invention are not soluble in water, but, unlike the polyvinyl ester, polyvinyl acetal and polyvinyl acetal-ester resins previously known, they are also, in general, not soluble in water-insoluble organic solvents at ordinary temperatures. (The term "ordinary temperatures" as used herein refers to temperatures below 40° C.; usually 30° C., or lower). Similarly, they are not dissolved at ordinary temperatures by ester plasticizers, although the new resins themselves have the unusual property of absorbing or dissolving sufficient quantities of ester plasticizers to yield adequately softened, homogeneous compositions. For example, the new resins at ordinary temperatures are generally insoluble in such organic liquids as aliphatic and aromatic hydrocarbons; in ketones; in chlorinated hydrocarbons, including ethylene dichloride, methylene chloride and chloroform; or in esters, such as ethyl acetate, diethyl phthalate and polyethylene glycol hexoates. Portions of the more highly acetalized resins of this invention may dissolve in certain of the chlorinated hydrocarbons or in certain of the ketones, but this partial solubility in the ketones and chlorinated hydrocarbons in no way indicates that such resins are beyond the scope of this invention or are lacking in the new properties which characterize the resins of this invention. These resins are, in general, soluble in water-soluble liquids, such as the alcohols, glycol monoalkyl ethers and the like. In any case, the most outstanding characteristic of the new resins is their virtual insolubility in water-insoluble ester plasticizers at ordinary temperatures, coupled with the capacity of the resins themselves to absorb sufficient quantities of these plasticizers to give homogeneous compositions which have high extensibility and elasticity while retaining a high ultimate strength. The new resins (and their plasticized compositions) are thermoplastic in nature, although they are less readily softened by heat than many of the polyvinyl ester, polyvinyl acetal and polyvinyl acetal-ester resins previously known. Their heat softening temperatures, in general, are inversely proportional both to the degree of acetalization and to the number of carbon atoms in the aldehyde used in the formation of the resins.

Plastic compositions having high flexibility coupled with high ultimate strength are of extreme importance for such specialized uses as the inner layers for laminated safety glass, where it is desirable to use a material having high flexibility in order to absorb the force of a blow over considerable displacement. It is also very desirable that the plastic have a high ultimate strength coupled with flexibility in order that an object striking the laminated glass will be restrained from continuing through it after its velocity has been reduced by the yielding inner layer. These desirable properties cannot be obtained in plastic compositions made from the known polyvinyl ester, polyvinyl acetal, polyvinyl acetal-ester, polyvinyl alcohol, or polyvinyl alcohol-acetal resins when rendered flexible by means of solvent plasticizers because, as pointed out above, the ultimate strength of such compositions is reduced greatly when these materials are made flexible by such plasticizers. In general, plastic compositions having high flexibility and elasticity and high ultimate strength may be defined as those which have an elongation, when subjected to tensile tests at ordinary temperatures, of at least about 200% and which do not fail at loads of less than about 2,000 pounds per square inch. The resins of this invention when adequately plasticized yield homogeneous compositions which usually surpass the limits set forth.

For example, a composition was made which consisted of 70% by weight of a polyvinyl partial acetal resin 62% acetalized with propionaldehyde, colloided with 30% by weight of triethylene glycol di(2-ethyl butyrate). At atmospheric temperatures this resin is insoluble in the plasticizer named, but, by various expedients known in the art, the resin and plasticizer can be combined to form clear and homogeneous compositions. The stress-strain characteristics of this composition were determined by subjecting specimens of it to increasing loads on a tensile testing machine while observing the elongation as a function of the load applied. The samples of this composition tested at atmospheric temperature were found to have an elongation of about 220% with an ultimate tensile strength of about 3,700 pounds per square inch.

The stress-strain properties of another composition also containing 30% by weight of triethylene glycol di(2-ethyl butyrate) and 70% by weight of a polyvinyl acetal resin were determined in a parallel test under identical conditions, but the resin in this case was more than 93% acetalized with propionaldehyde and was almost completely soluble in the plasticizer at ordinary temperatures. This composition possessed tensile properties vastly different from that first discussed, and, although its elongation was around 300%, its ultimate tensile strength was less than 300 pounds per square inch.

It is the elastic and tensile properties of the plasticized compositions made from the polyvinyl partial acetal resins of my invention which render the new resins so useful in the manufacture of non-shattering laminated glass, for coating fabric materials, and in many other uses, and which also distinguish these new resins from all of the known polyvinyl acetals and related classes of vinyl resins.

The resins of this invention may be formed from polyvinyl alcohol by reaction with aldehyde material containing at least one saturated aliphatic aldehyde having from 3 to 5 carbon atoms in its molecule (in this case, propionaldehyde) in the presence of an acidic substance as a catalyst. Polyvinyl alcohol itself may be used as the starting substance, or the reaction with aldehyde may proceed simultaneously with the hydrolysis, alcoholysis or saponification of a polyvinyl ester. For example, resins of uniform quality result when a water solution of the polyvinyl alcohol is acidified with an inorganic acid substance, preferably a mineral acid, such as hydrochloric or sulfuric acid, and the aldehyde added with constant stirring. Before any of the actual resin is allowed to precipitate from the aqueous reaction mixture, an organic solvent for the resin which is miscible with water is added to maintain the resin in solution. Examples of such solvents are methanol, ethanol and isopropanol. By adding suitable amounts of the organic solvent (acidified if necessary) as the aldehyde is added, any desired proportion of aldehyde and polyvinyl alcohol within the ranges set forth may be reacted while the entire system is maintained as a single liquid phase.

An example of the conduct of the process according to the method just described is given below for purposes of illustration:

44 parts by weight of polyvinyl alcohol (molecular weight about 6,000 to 7,000) was dissolved in 200 parts by weight of water and 40 parts by weight of methyl alcohol and 36.8 parts by weight of sulfuric acid (sp. gr. 1.84) dissolved in additional methyl alcohol were added. To this solution was added 87 parts by weight of propionaldehyde dissolved in an equal volume of methyl alcohol, and the entire mixture was agitated. Further quantities of methyl alcohol were added from time to time as required to maintain the whole in liquid phase, until a total of 800 parts by weight had been added. The entire reaction consumed 20 hours, all at room temperature, and thereafter the resin was precipitated from the reaction mixture by the addition of water.

The aqueous suspension of precipitated resin was made slightly alkaline with sodium hydroxide and washed. Finally, it was redissolved, and the solution was filtered. The resin was then precipitated and dried. This resin, on analysis, was found to be 62% acetalized.

The degrees of acetalization of the specific resins referred to above were calculated from the quantities of aldehyde in the resins as determined by the following method:

A 2-gram sample of the dry resin is accurately weighed and placed in a 500 cc. Erlenmeyer flask with 50 cc. of normal butanol and 50 cc. of half normal hydroxylamine hydrochloride solution. The sample is then refluxed for two hours in parallel with a blank. Thereafter, 50 cc. of methanol together with brom phenol blue indicator is added and the mixture titrated with half normal sodium hydroxide solution. From the difference between the titrations of the sample and the blank there may be calculated the amount of hydrochloric acid liberated from the hydroxylamine hydrochloride on the combination of hydroxylamine with aldehyde. From this value the quantity of aldehyde present in the resin, or its degree of acetalization, may be calculated.

Modifications of the invention will be apparent to those skilled in the art. For example, if large variations are made in the amounts of plasticizer to be incorporated with the resin or in the allowable water absorption or heat softening point of the resin, the composition of the resin may vary from those specifically set forth above. In addition, the resins may contain a limited proportion of ester, ketone, other aldehyde or functional groups normally foreign to the resins of this invention, but in any case it is essential that such variations as are made in the resin composition, or the presence of such functional groups other than free hydroxyl and acetal groups of the aldehydes set forth within the limits recited, must not be sufficient to affect the solubility properties which are characteristic of the new resins, primarily, that ability of the resin to form, with water-insoluble ester plasticizers, homogeneous compositions which are elastic and highly extensible while retaining high ultimate strength. The polyvinyl partial acetal resins which are modified in non-material respects as indicated are included within the scope of this invention, which should not be limited other than as defined by the appended claims.

This application is, in part, in continuation of and contains claims and subject matter divided from my copending application Serial No. 236,556, filed October 22, 1938, which, in turn, is, in part, in continuation of my copending application Serial No. 741,997, filed August 29, 1934, and in continuation of my copending application Serial No. 115,476, filed December 12, 1936.

I claim:

1. A tough and strong artificial resin substantially identical with a resin resulting from the condensation of polyvinyl alcohol with sufficient propionaldehyde to combine with from about 62% to about 88% of the hydroxyl groups of said polyvinyl alcohol, the total extent of acetalization and the proportion of free hydroxyl groups in said resin being so correlated that said resin is substantially insoluble in triethylene glycol di(2-ethyl butyrate) plasticizer at ordinary temperatures but is compatible with substantial quantities of said plasticizer to form therewith flexible and elastic compositions which have at ordinary temperatures an elongation of at least about 200% and an ultimate strength above about 2,000 pounds per square inch.

2. A tough and strong artificial resin substantially identical with a resin resulting from the condensation of polyvinyl alcohol with aldehyde material comprising propionaldehyde, the total extent of aldehyde combination in said resin and the proportion of free hydroxyl groups thereof being so correlated that said resin is substantially insoluble in triethylene glycol di(2-ethyl butyrate) plasticizer at ordinary temperatures but is compatible with substantial quantities of said plasticizer to form therewith flexible and elastic compositions which have at ordinary temperatures an elongation of at least about 200% and an ultimate strength above about 2,000 pounds per square inch.

3. A tough and strong artificial resin composed of a polyvinyl partial acetal resin acetalized with propionaldehyde between about 62% and about 88%, the degree of acetalization with propionaldehyde and the proportion of free hydroxyl groups in said resin being so correlated that said resin is compatible with substantial quantities of triethylene glycol di(2-ethyl butyrate) plasticizer while being virtually insoluble in said plasticizer at ordinary temperatures.

4. A strong and resilient homogeneous composition of matter having an elongation of at least about 200% and an ultimate strength above about 2,000 pounds per square inch at ordinary temperatures, which is essentially composed of a water-insoluble ester plasticizer and a polyvinyl partial acetal resin substantially identical with a resin resulting from the condensation of polyvinyl alcohol with sufficient propionaldehyde to combine with from about 62% to about 88% of the hydroxyl groups of said polyvinyl alcohol, the total extent of acetalization and the proportion of free hydroxyl groups in said resin being so correlated that said resin is substantially insoluble in said plasticizer at ordinary temperatures but is compatible with a substantial quantity of said plasticizer to yield said homogeneous composition therewith.

5. A tough and strong composition of matter essentially composed of a water-insoluble ester plasticizer and a polyvinyl partial acetal resin acetalized with propionaldehyde between about 62% and about 88%, the degree of acetalization with propionaldehyde and the proportion of free hydroxyl groups in said resin being so correlated that said resin is virtually insoluble in said plasticizer at ordinary temperatures but is compatible with substantial quantities of said plasticizer to yield flexible and resilient homogeneous compositions therewith.

6. Process for making a polyvinyl partial acetal resin which comprises forming a water solution of polyvinyl alcohol; adding to said solution an inorganic acidic substance, propionaldehyde, and an organic solvent which in admixture with water is capable of dissolving said resin; the amount of propionaldehyde added being sufficient to react with from about 62% to about 88% of the hydroxyl groups of the polyvinyl alcohol present; and the rate at which said acidic substance, said propionaldehyde, and said organic solvent are added being such as to maintain the whole in liquid phase.

HAROLD F. ROBERTSON.